United States Patent [19]

Prakken

[11] 4,148,213

[45] Apr. 10, 1979

[54] APPARATUS FOR DISCARDING LEAKY PACKAGES FROM A ROW OF FILLED SEALED PACKAGES

[76] Inventor: Bouwe Prakken, Spijkerlaan 9, Kamerik, Netherlands

[21] Appl. No.: 805,034

[22] Filed: Jun. 9, 1977

[30] Foreign Application Priority Data

Jun. 9, 1976 [NL] Netherlands ................... 7606232

[51] Int. Cl.$^2$ ............................................. G01M 3/04
[52] U.S. Cl. ................................. 73/45.4; 209/617; 209/699; 209/644
[58] Field of Search ............... 209/74 R, 71, 72, 82, 209/90, 91; 73/41.3, 45, 52, 45.4

[56] References Cited

U.S. PATENT DOCUMENTS

| 2,340,775 | 2/1944 | Snyder | 209/90 |
| 2,895,611 | 7/1950 | Barkway | 209/104 |
| 3,319,784 | 5/1967 | Granger | 209/74 |
| 4,024,956 | 5/1977 | Cassidy | 73/52 |

Primary Examiner—Allen N. Knowles
Attorney, Agent, or Firm—Finnegan, Henderson, Farabow & Garrett

[57] ABSTRACT

Apparatus for discarding leaky packages from a row of filled sealed packages on a conveyor belt comprising means for exerting pressure on the packages while on the belt and means for removing packages from the belt which appear to be leaky when subjected to said pressure, wherein said means for exerting pressure comprises the conveyor belt and a member located above said belt that in cooperation exert pressure on a package on the belt, either one of said member or belt being movable with respect to the other and the smallest distance between said belt and said member being chosen so that only a tight package is clamped therebetween while a leaky package is not, and said means for removing the leaky packages comprises a nozzle that blows air agains the packages in the space between said belt and member, whereby unclamped leaky packages will be removed from the conveyor belt.

4 Claims, 2 Drawing Figures

APPARATUS FOR DISCARDING LEAKY PACKAGES FROM A ROW OF FILLED SEALED PACKAGES

The invention relates to apparatus for discarding leaky packages from a row of filled sealed packages, comprising means for exerting pressure on the packages and means for removing packages which appear to be leaky when subjected to said pressure.

The number of articles of food packed in a heat sealed bag is rather big. A known example is chips. To be able to automate the packing of such bags into boxes it is necessary that leaky or improperly sealed bags be removed. The presence of pieces of cellophane or loose chips or other loose material in the boxes is unacceptable. Since no solution for this problem exists up until now, the packing of filled heat sealed bags into boxes has taken place by hand.

The object of the invention is to give a solution for this problem and to provide an apparatus of the above mentioned type having a very simple construction and with which leaky bags may be discarded automatically.

To this end the means for exerting pressure consists of a conveyor belt and a movable or a rotatable member above said belt, the smallest distance between said belt and said movable or rotatable member being chosen so that a tight or properly sealed package is clamped therebetween while a leaky package is substantially not clamped therebetween, and said means for removing the leaky packages comprises a nozzle for blowing air against the packages.

Preferably the movable or rotatable member is a conveyor belt, whereby one of the conveyor belts is displaceable against the action of springs or a weight in a direction substantially perpendicular to the other conveyor belt, stop means being mounted to maintain said smallest distance between the facing surfaces of said conveyor belts.

When a tight bag passes between both conveyor belts, the displaceable belt is pushed away against the action of springs and/or its own weight so that that bag is clamped with sufficient force between both belts. In case a leaky non-tight bag moves between the belts, the displaceable conveyor belt will not or only slightly be pushed away so that that bag will not encounter a clamping action. Consequently this bag is blown away by the blowing air from the nozzle.

The invention will now be elucidated with the aid of the drawings showing schematically an embodiment.

Figure 1:
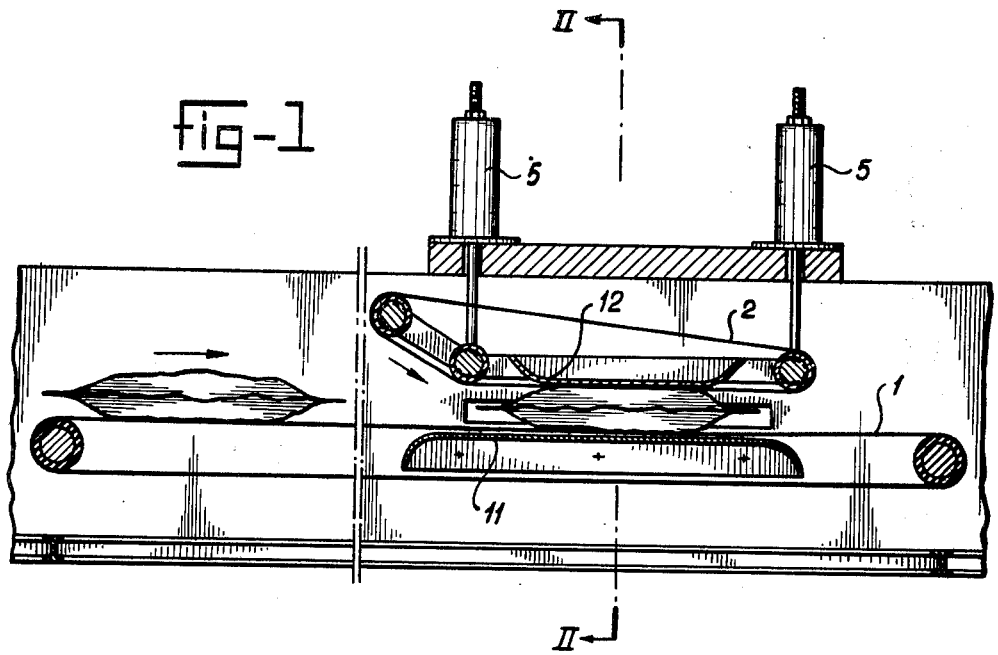
FIG. 1 is a longitudinal section.
Figure 2:
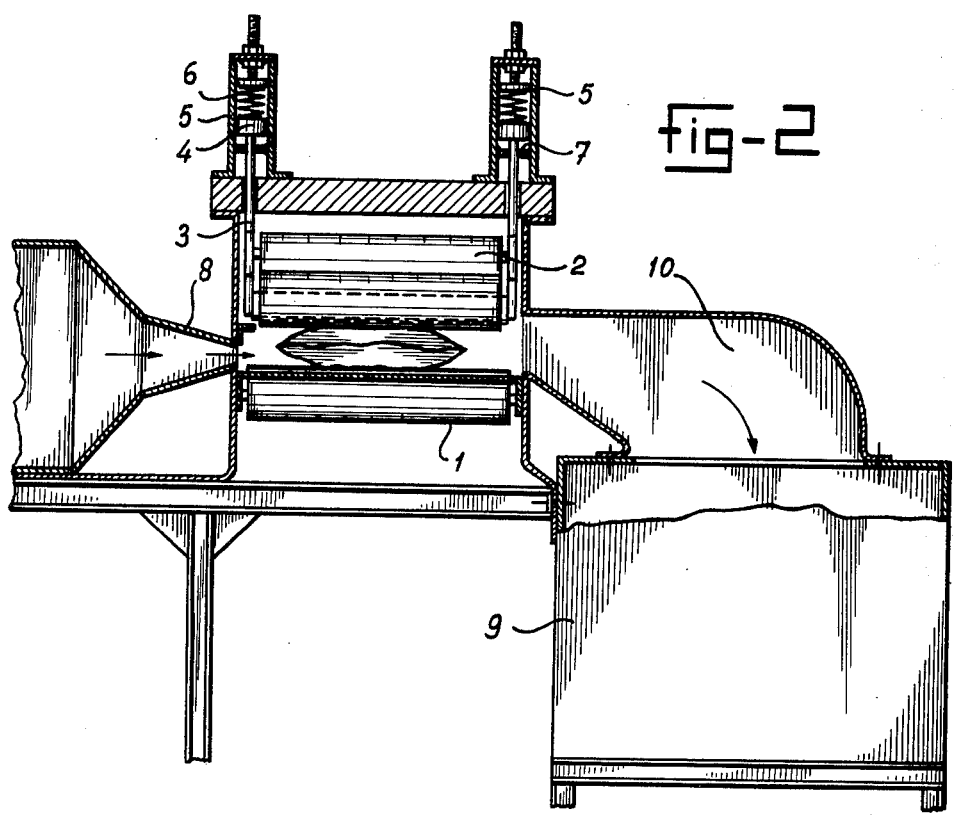
FIG. 2 is a section according to line II — II in FIG. 1.

The apparatus shown in the drawings is destined to be used in the supply line of a machine for automatically packing filled bags (e.g. filled with chips) into boxes, in which a longitudinal edge and a transverse edge of the bags are sealed by heat sealing. The aim of the apparatus is to discard or remove leaky bags. It consists of two conveyor belts 1, 2 one above the other, of which the lower belt has a fixed position and the upper belt is displaceable upwards and downwards. The outer surface of the conveyor belts is coated with a layer of foamed plastic.

The frame of the upper belt 2 is provided with rods 3, of which the piston-shaped upper ends 4 are guided in cylinders 5. An adjustable spring 6 exerts a certain pressure onto each piston. Consequently the springs load the belt 2 downwards. A minimum distance between the facing conveyor surfaces of the belts 1, 2 is maintained by stop means 7 on which the pistons may engage. This minimum distance will be anyhow somewhat smaller than the height of a tight bag.

During action the belts 1 and 2 will have the same speed. The driving motors are not shown.

A tight bag supplied in the direction of the arrow onto the belt 1, will push the belt 2 upwards and will be simultaneously clamped between belts 1 and 2. A nozzle 8 for the supply of blowing air is mounted next to the space between both belts 1 and 2. Opposite this nozzle on the other side of the belts 1 and 2 is a discharge channel 10, emptying into a waste bin 9.

A tight bag is clamped between belts 1 and 2 will encounter sufficient clamping force so as to not be blown away into channel 10 by the blowing air. In case a leaky bag moves between the conveyor belts 1 and 2, however, the pistons 4 will engage the stop means 7 and the bag will not be clamped with sufficient force between belts 1 and 2 to prevent it from being blown away by the nozzle 8. Consequently the leaky bag is blown into channel 10 and discharged into bin 9.

Support plates 11, 12 are mounted at a small distance from the conveying surfaces of belts 1 and 2 to support the belts.

Other modifications are possible. For instance the upper conveyor belt 2 could be replaced by a roller mounted at the end of a hinge arm which by a spring and/or its own weight is pushed downwards. The guiding of belt 2 could have another construction. Also, if conveyor belt 2 was of sufficient weight, the springs 6 would not be necessary.

I claim:

1. Apparatus for discarding leaky packages from a row of filled sealed packages on a conveyor belt comprising means for exerting pressure on the packages while on the belt and means for removing packages from the belt which appear to be leaky when subjected to said pressure, wherein said means for exerting pressure comprises the conveyor belt and a member located above said belt that in cooperation exert pressure on a package on the belt, either one of said member or belt being movable with respect to the other and the smallest distance between said belt and said member being chosen so that only a tight package is clamped therebetween while a leaky package is not, and said means for removing the leaky packages comprises a nozzle that blows air against the packages in the space between said belt and member, whereby unclamped leaky packages will be removed from the conveyor belt.

2. The apparatus of claim 1, wherein said member is an upper conveyor belt that moves in the same direction as the package conveyor belt, and wherein one of said belts is displaceable in a direction substantially perpendicular to the other and including stop means to maintain said smallest distance between the facing surfaces of said belts.

3. The apparatus of claim 2, wherein said upper conveyor belt is displaceable upward relative to the package conveyor belt, the stop means limiting downward movement of the upper conveyor belt to maintain said smallest distance.

4. The apparatus of claim 3, wherein said upper conveyor belt is displaceable against the action of springs, the springs exerting the necessary downward pressure on a tight package to clamp it between the belts.

* * * * *